United States Patent
Yui et al.

(10) Patent No.: US 9,993,949 B2
(45) Date of Patent: Jun. 12, 2018

(54) PREFORM MEMBER BONDING METHOD

(71) Applicant: MITSUBISHI AIRCRAFT CORPORATION, Aichi (JP)

(72) Inventors: Yuichi Yui, Tokyo (JP); Akihisa Okuda, Tokyo (JP); Hiromichi Akiyama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days. days.

(21) Appl. No.: 15/138,450

(22) Filed: Apr. 26, 2016

(65) Prior Publication Data

US 2016/0346963 A1 Dec. 1, 2016

(30) Foreign Application Priority Data

May 28, 2015 (JP) .................. 2015-108081

(51) Int. Cl.
| | |
|---|---|
| *B29C 70/48* | (2006.01) |
| *B29C 35/02* | (2006.01) |
| *B29C 70/44* | (2006.01) |
| *B29K 105/08* | (2006.01) |

(52) U.S. Cl.
CPC ........ *B29C 35/0288* (2013.01); *B29C 70/443* (2013.01); *B29C 2035/0283* (2013.01); *B29K 2105/0872* (2013.01)

(58) Field of Classification Search
CPC ........ B29C 35/0288; B29C 2035/0283; B29C 70/443; B29C 70/48; B29C 70/86; B29K 2105/0872

USPC ........................................... 156/64
See application file for complete search history.

(56) References Cited

U.S. PATENT DOCUMENTS

2009/0252921 A1* 10/2009 Bottler .................. B29C 70/086
428/116
2014/0326074 A1* 11/2014 Van Voast .............. G01N 19/04
73/827

FOREIGN PATENT DOCUMENTS

| EP | 2913180 A1 * | 9/2015 | .......... B29C 70/443 |
| JP | 2003-011231 A | 1/2003 | |
| JP | 2003011231 A * | 1/2003 | |

* cited by examiner

*Primary Examiner* — George Koch
(74) *Attorney, Agent, or Firm* — Pearne & Gordon LLP

(57) ABSTRACT

Provided is a preform member bonding method, in a RTM process, for bonding a preform member and another member (a preform member or a hardened member) together with an adhesive. The preform member bonding method includes: beforehand obtaining data on a range of a level of progress in hardening of the adhesive which allows the adhesive to penetrate the preform member, and data on a range of the level of progress in the hardening of the adhesive which decreases bonding strength of the adhesive; and controlling the level of progress in the hardening of the adhesive by heat-treating the adhesive based on these data, before the preform member comes into contact with the adhesive.

3 Claims, 4 Drawing Sheets

PREFORM MEMBER BONDING METHOD

TECHNICAL FIELD

The present invention relates to a preform member bonding method in RTM (Resin Transfer Molding).

BACKGROUND ART

The RTM process is a molding method including: laying a preform member made of composite material, such as reinforcing fiber base material (glass fiber, carbon fiber, or the like), on a mold; hermetically sealing a vacuum bag film or mold with the preform member placed therein; and injecting resin into the resultant vacuum bag film or mold through vacuum suction to impregnate the preform member with the resin. The use of the RTM process has an advantage which makes it possible to mold the composite material at low cost without a need of an expensive autoclave or the like.

There are cases where pre-heating is performed as a step of the RTM process. The pre-heating is to heat a preform member, making it easy for the preform member to be impregnated with resin.

CITATION LIST

Patent Literature(s)

{Patent Literature 1} Japanese Patent Application Publication No. 2003-11231

SUMMARY OF INVENTION

Technical Problem

Because of their shapes, some workpieces are hard to form as a unitary component from the beginning. In such cases, separately-produced members are bonded together to form a unitary component <for example, the above Patent Literature 1>. The RTM process bonds preform members together, or bonds a preform member and a workpiece which has been hardened (hereinafter referred to as a "hardened member") together, with an adhesive inserted between bonding surfaces of the respective members by heating them after resin impregnation.

As described above, there are cases where heating is performed before or during the resin impregnation in the RTM process. Once the workpiece including the adhesive is heated, the viscosity of the adhesive becomes lower as the temperature becomes higher. As a result, the adhesive is sucked into the preform member, and adheres to (the surfaces of) fiber strands in the preform member.

This resultant condition makes the resin impregnation unsuccessful because the resin will not penetrate the fiber strands to the surfaces of which the adhesive attaches, so that the preform member is not sufficiently impregnated with the resin. Thus, the strength of the workpiece decreases.

Against the background, an object of the present invention is to propose a preform member bonding method capable of preventing a preform member from not being impregnated with resin as a result of penetration of an adhesive into the preform member in a workpiece, and concurrently preventing a decrease in bonding strength of the adhesive, as well as consequently securing strength of the workpiece, in a pre-heating step of the RTM process, that is to say, in a heating step before or during resin impregnation.

Solution to Problem

A first aspect of the invention to solve the above problem provides a preform member bonding method of bonding a preform member and another member with an adhesive in an RTM process, including:

beforehand obtaining data on a range of a level of progress in hardening of the adhesive which allows the adhesive to penetrate the preform member, and data on a range of the level of progress in the hardening of the adhesive which decreases bonding strength of the adhesive; and controlling the level of progress in the hardening of the adhesive by heat-treating the adhesive based on these data, before the preform member comes into contact with the adhesive.

A second aspect of the invention to solve the above problem provides the preform member bonding method according to the first aspect of the invention, in which the level of progress in the hardening of the adhesive is examined by carrying out an evaluation test on how much the adhesive is sucked into the preform member at a time when the preform member comes into contact with the adhesive, and a peeling test on the adhesive at a time when resin and the adhesive are completely hardened in the RTM process.

Advantageous Effects of Invention

According to the preform member bonding method of the first aspect of the invention provides a preform member bonding method of bonding a preform member and another member with an adhesive when an RTM process is performed on a workpiece. The preform member bonding method includes: beforehand obtaining data on a range of a level of progress in hardening of the adhesive which allows the adhesive to penetrate the preform member, and data on a range of the level of progress in the hardening of the adhesive which decreases bonding strength of the adhesive; and optimizing the level of progress in the hardening of the adhesive by heat-treating the adhesive at a temperature, and for a length of time, both adjusted based on these data, before the preform member comes into contact with the adhesive. For this reason, pre-heating in the RTM process, that is to say, heating before and during resin impregnation, makes it possible to prevent the preform member from not being impregnated with the resin as a result of the penetration of the adhesive into the preform member in the workpiece, and to prevent a decrease in the bonding strength of the adhesive. Consequently, the strength of the workpiece can be secured.

According to the preform member bonding method of the second aspect of the invention, in the preform member bonding method of the first aspect of the invention, the level of progress in the hardening of the adhesive is examined by carrying out the evaluation test on how much the adhesive is sucked into the preform member at the time when the preform member comes into contact with the adhesive, and the peeling test on the adhesive at the time when resin and the adhesive are completely hardened in the RTM process. For this reason, the level of progress in the hardening can be more accurately evaluated.

DESCRIPTION OF EMBODIMENTS

Descriptions will be hereinbelow provided for a preform member bonding method of an embodiment of the present invention by use of the drawings.

Embodiments

The preform member bonding method of the embodiment of the present invention will be described using FIGS. 1 to 5.

Figure 1:
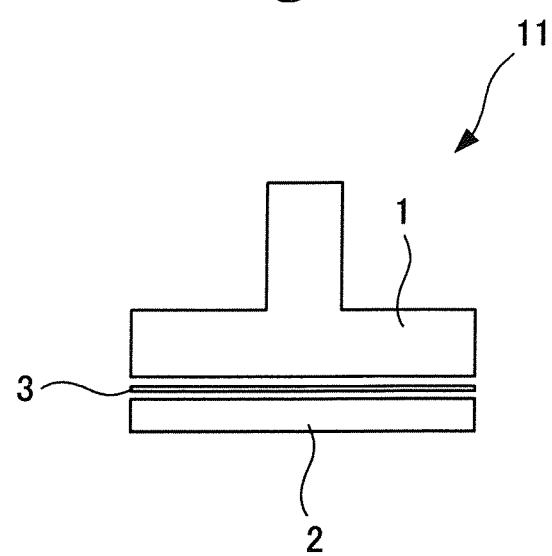
FIG. 1 is a schematic diagram of a workpiece including: a preform member shaped like the letter T; a hardened member; and an adhesive interposed between the two members.

FIG. 1 is a schematic diagram of a workpiece 11 including: a T-shaped preform member 1; a hardened member 2; and an adhesive 3 inserted between the two members. The preform member bonding method of the embodiment of the present invention is a method of bonding the preform member 1 and the hardened member 2 together by applying a VaRTM (Vacuum-assisted Resin Transfer Molding) process, which is a variation of the RTM process, to the workpiece 11.

The embodiment is intended for a process of manufacturing the workpiece 11. Heat has an influence on the adhesive 3 in staging (ST), heating before resin impregnation (RI Pre-heat), resin impregnation (RI), bleeding (Bleed) and curing (Cure) in the manufacturing process.

The "staging" is a step of beforehand heat-treating the adhesive 3 as placed in a bond area of a hardened member. No preform member 1 is included in the workpiece 11 yet. The staging makes it possible to increase the level of progress in hardening of the adhesive 3, and to raise the viscosity of the adhesive 3.

The "heating before the resin impregnation" is a step of: placing the preform member 1 on the adhesive 3; and heating the workpiece 11 prior to the resin impregnation.

The "resin impregnation" is a step of performing the resin impregnation while keeping the workpiece 11 heated.

The "bleeding" is a step of discharging an excessive portion of the resin which has been injected in the resin impregnation. The bleeding may be started either after or before full completion of the resin impregnation.

Figure 2:
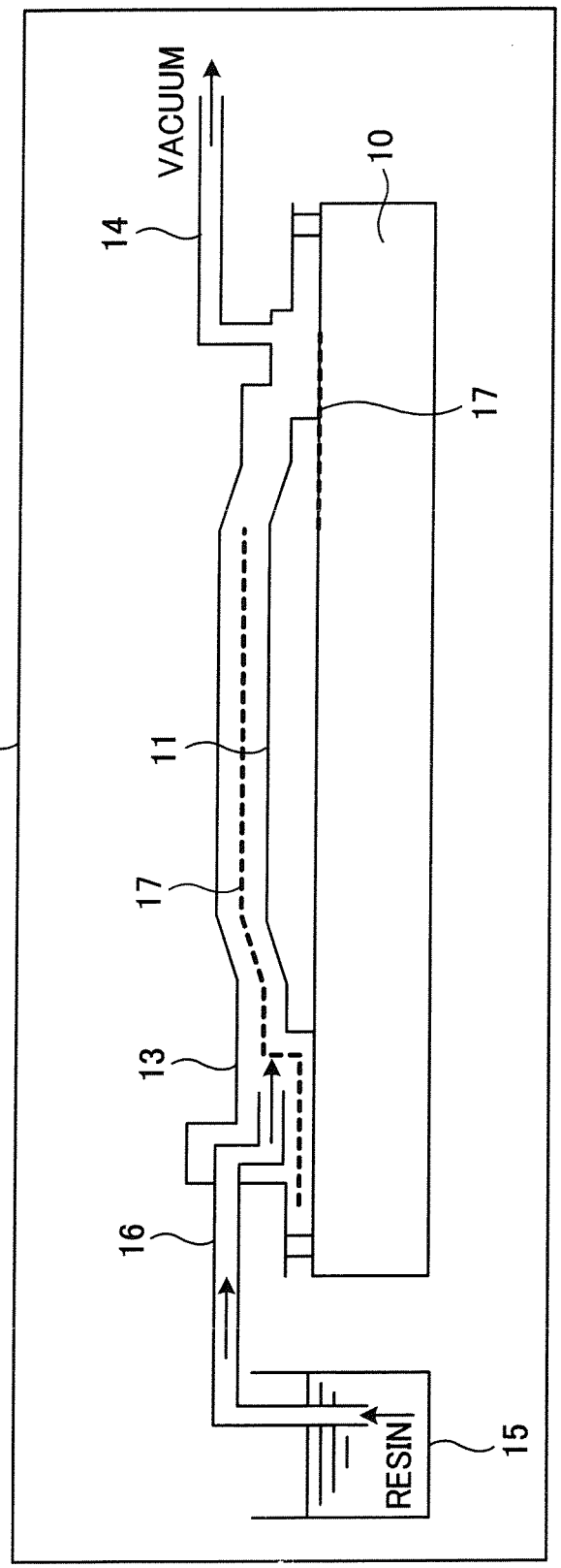
FIG. 2 is a schematic diagram of an apparatus for performing a VaRTM process.

FIG. 2 is a schematic diagram of an apparatus configured to perform the VaRTM process (albeit the schematic representation makes the shape of the workpiece 11 look different from the shape of the workpiece 11 shown in FIG. 1). As shown in FIG. 2, the VaRTM process is performed by: on a mold 10, hermetically sealing a vacuum bag film 13 with the workpiece 11 therein; placing the workpiece 11 under vacuum by suctioning air from the inside of the vacuum bag film 13 thought a suction pipe 14; and thereafter heating the workpiece 11 using a heater 12 via the mold 10 and the vacuum bag film as a preparation before resin impregnation.

After that, a resin reservoir 15 containing resin is made to communicate with the inside of the vacuum bag film 13 through a resin supply pipe 16 to thereby inject the resin into the vacuum bag film 13. The thus-injected resin is spread over all the surface of the workpiece 11 with the assistance of a resin distribution sheet 17 covering the workpiece 11. Subsequently, the workpiece 11 is impregnated with the resin (resin impregnation).

After or before full completion of the resin impregnation, the bleeding is started. Incidentally, the following description will be provided for a case where the bleeding is started before the completion of the resin impregnation.

Figure 3:
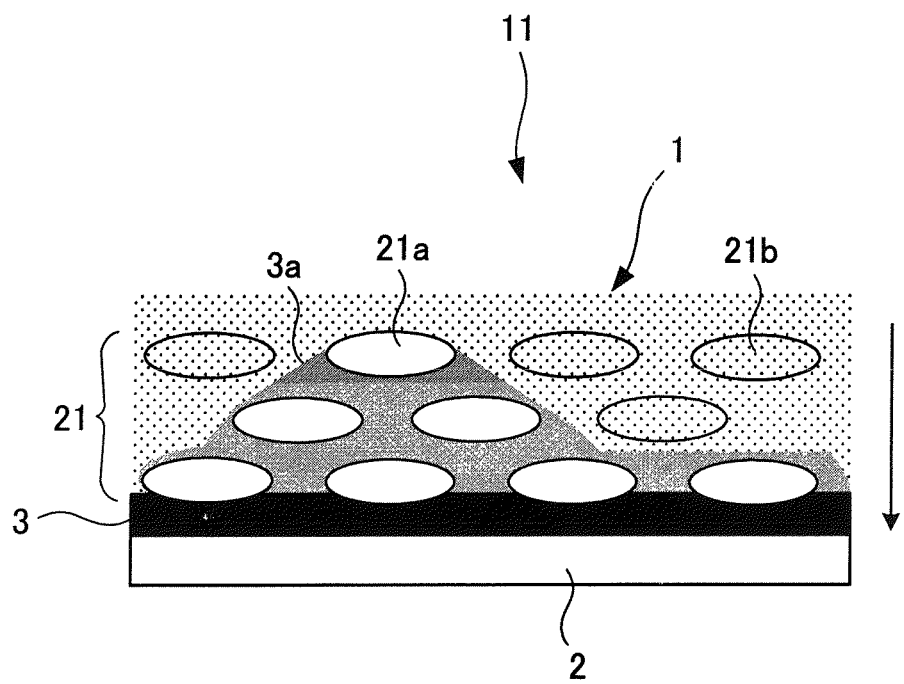
FIG. 3 is a schematic diagram for explaining how the preform member is impregnated with resin when the workpiece using the adhesive which has not been heat-treated in advance is heated for hot compaction, or before or during resin impregnation.

Here, using FIG. 3, an explanation will be provided for a mechanism by which some part of the preform member cannot be impregnated with the resin when the viscosity of the adhesive 3 shown in FIG. 1 is lower than a predetermined value. FIG. 3 is a schematic diagram for explaining how the preform member is impregnated with the resin when the workpiece 11 using the adhesive 3 which has not been subjected to the staging is heated before or during the resin impregnation. A dotted area in the diagram represents part of the preform member which is impregnated with the resin.

As shown in FIG. 3, the preform member 1 includes multiple fiber strands 21. The heating before or during the resin impregnation makes the adhesive 3 sucked into the preform member 1, as described above. A thus-sucked adhesive 3a covers the surface of some fiber strands 21a.

If while the preform member 1 is in this condition, the resin spreads in an arrow-indicated direction in FIG. 3, fiber strands 21b existing in a part of the preform member 1 into which no adhesive 3a penetrates are impregnated with the resin, while the fiber strands 21a whose surfaces have been covered with the sucked-in adhesive 3a will not be impregnated with the resin. That is to say, some part of the preform member 1 will not be impregnated with the resin. Incidentally, the adhesive 3a also only covers the surfaces of the fiber strands 21a, but does not penetrate the fiber strands 21a. Thus, the strength of the workpiece 11 is not secured sufficiently.

On the other hand, the adhesive 3 being subjected to the staging until the viscosity of the adhesive 3 becomes equal to or greater than the predetermine value means that the viscosity of the adhesive 3 becomes high enough for the adhesive 3 not to be sucked into the preform member, so that it is possible to prevent the preform member from sucking the adhesive.

Figure 4:
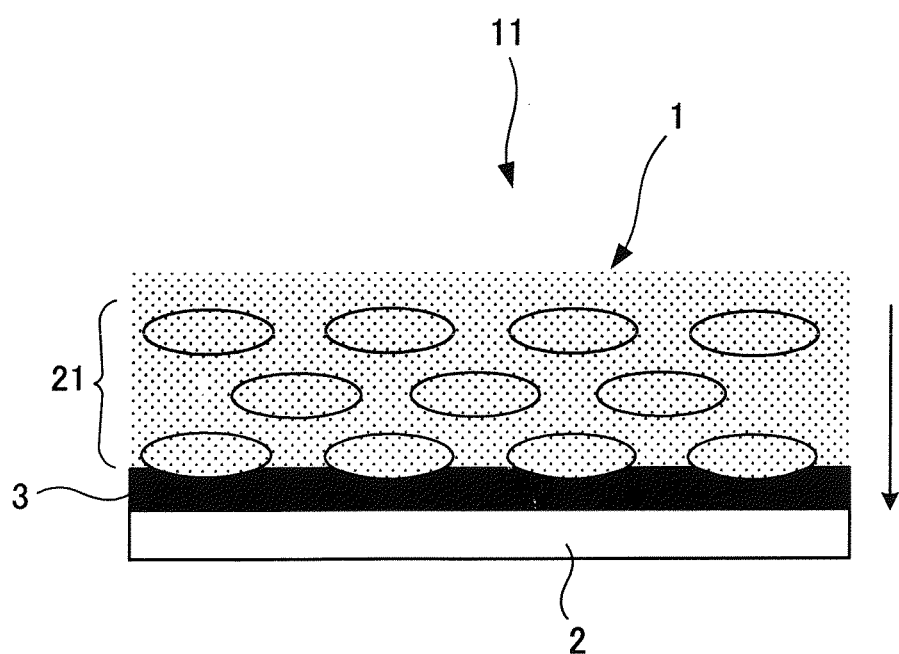
FIG. 4 is a schematic diagram for explaining how the preform member is impregnated with the resin when the workpiece using the adhesive which has been heat-treated in advance is heated for hot compaction, or before or during resin impregnation.

FIG. 4 is a schematic diagram for explaining how the preform member is impregnated with the resin when the workpiece 11 using the adhesive 3 which has been subjected to the staging until the viscosity thereof becomes equal to or greater than the predetermined value is heated before or during the resin impregnation. A dotted area in the diagram represents part of the preform member which is impregnated with the resin.

As shown in FIG. 4, no adhesive 3 is sucked into the preform member 1, as described above, although heated before or during the resin impregnation. Thus, the surfaces of the fiber strands 21 are not covered with the adhesive 3a, unlike in the case shown in FIG. 3. Accordingly, if the resin keeps spreading in an arrow-indicated direction in this condition, all the fiber strands 21 in the preform member 1 are impregnated with the resin.

The preform member bonding method of the embodiment of the present invention makes it possible to secure the strength of the workpiece 11 by, as described above, preventing the preform member from not being impregnated with the resin.

It should be noted that the foregoing viscosity can be obtained using the level of progress in the hardening and the temperature. For this reason, the same effect as described above can be obtained by heat-treating the adhesive 3 in advance with the level of progress in the hardening taken into consideration.

Properties of the adhesive 3 have influences which the adhesive 3 exerts on the strength of the workpiece 11 when the adhesive 3 is heat-treated. One property thereof is that, as described above, the preform member 1 will not be impregnated with the resin when the adhesive 3 penetrates the preform member 1. Another property thereof is a change in bonding strength of the adhesive 3. Nevertheless, the problem with the change in the bonding strength can be also solved by adjusting conditions for heating the adhesive 3 in advance with the level of progress in hardening of the adhesive 3 taken into consideration. Accordingly, the strength can be secured To put it specifically, the preform member bonding method according to the embodiment of the present invention is achieved by: beforehand obtaining data on a range of the level of progress in the hardening of the adhesive 3 which allows the adhesive 3 to penetrate the preform member 1, and data on a range of the level of progress in the hardening of the adhesive 3 which decreases the bonding strength of the adhesive 3; and optimizing the level of progress in the hardening of the adhesive 3 by heat-treating the adhesive 3 at a temperature and for a length of time, both adjusted based on these data, before the preform member 1 comes into contact with the adhesive 3.

Figure 5:
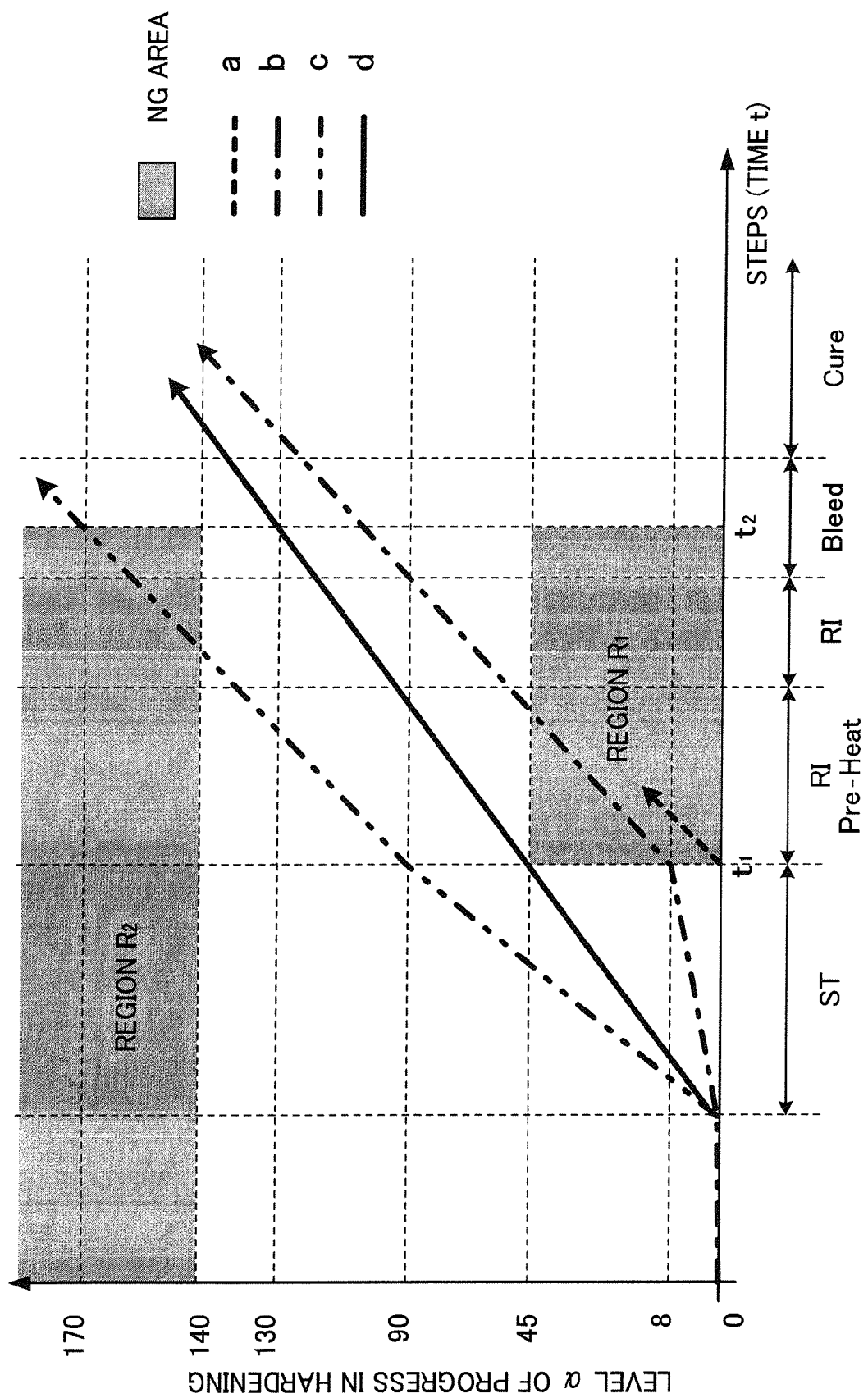
FIG. 5 is a graph showing how a level of progress in hardening of the adhesive changes in a step of heating the adhesive.

FIG. 5 is a graph showing how the level of progress of the hardening of the adhesive 3 changes in the step of heat-treating the adhesive 3. In the graph, the vertical axis represents the level $\alpha$ of progress in the hardening, while the horizontal axis represents the steps and time t. The level $\alpha$ of progress in the hardening is shown as a value which represents how much the hardening of the adhesive progresses. Incidentally, no unit is provided to the vertical axis, and values in the graph are shown as examples.

An area (NG area) in which the strength of the workpiece 11 decreases is set in FIG. 5. Furthermore, two areas, a region $R_1$ in which the preform member is not impregnated with the resin and a region $R_2$ in which the bonding strength of the adhesive 3 decreases, are set in the NG area.

FIG. 5 shows that if the level $\alpha$ of progress in the hardening<45 at time t1, the level $\alpha$ of progress in the hardening is to pass through the region $R_1$, and that if the level $\alpha$ of progress in the hardening≥140 at time t2, the level $\alpha$ of progress in the hardening has passed through the region $R_2$. Time t1 is a time at which the heating before resin impregnation (RI Pre-heat) step is started. In addition, time t2 is a time at which the resin impregnation in the resin impregnation (RI) step is completed. Incidentally, values of the level $\alpha$ of progress in the hardening which make the regions $R_1$, $R_2$ respectively occur differ depending on types and the like of the workpiece 11 and the adhesive 3. The values need to be obtained in advance from experimental data and the like.

It should be noted that time t2 is set in the middle of the bleeding (Bleed) step in FIG. 5. The reason for this is that the embodiment is designed to start the bleeding (Bleed) step before the resin impregnation in the resin impregnation (RI) step is completed. In a case where the bleeding (Bleed) step is started after the resin impregnation is fully completed, time t2 is set after the resin impregnation step is completed (that is to say, at a time of starting the bleeding).

In FIG. 5, lines a to d are provided to show a diagram of an image of how the level $\alpha$ of progress in the hardening differs depending on a change in the condition for the staging step. The lines a to d are those estimated based on values of the level $\alpha$ of progress in the hardening which were measured at time t1 and time t2. At time t1, the level $\alpha$ of progress in the hardening was obtained by an evaluation test on how much the adhesive 3 was sucked into the preform member 1. At time t2, the level $\alpha$ of progress in the hardening was obtained by a peeling test on the adhesive 3. In other words, in the embodiment, the level $\alpha$ of progress in the hardening of the adhesive 3 is examined by carrying out the evaluation test on how much the adhesive 3 was sucked into the preform member 1 at a time when the adhesive 3 and the preform member 1 come into contact with each other, and the peeling test on the adhesive 3 at a time when the resin and the adhesive come into contact with each other in the VaRTM process. This makes it possible to accurately evaluate the level $\alpha$ of progress in the hardening.

The line a represents the level $\alpha$ of progress in the hardening in a case where no staging was performed. The line b represents the level $\alpha$ of progress in the hardening in a case where the staging was performed until the level $\alpha$ of progress in the hardening became equal to 8. The line c represents the level $\alpha$ of progress in the hardening in a case where the staging was performed until the level $\alpha$ of progress in the hardening became equal to 90. The line d represents the level $\alpha$ of progress in the hardening in a case where the staging was performed until the level $\alpha$ of progress in the hardening became equal to 45.

In the case where no staging is performed, the start of the heating before the resin impregnation makes the level $\alpha$ of progress in the hardening begin to rise at time t1 when $\alpha=0$. As a result, the line a passes through the region $R_1$, which means that the preform member will not be impregnated with the resin.

In the case where the staging is performed until the level $\alpha$ of progress in the hardening becomes equal to 8, the start of the heating before the resin impregnation makes the level $\alpha$ of progress in the hardening begin to rise at time t1 when $\alpha=8$. As a result, like the line a, the line b passes through the region $R_1$, which means the preform member will not be impregnated with the resin.

In the case where the staging is performed until the level $\alpha$ of progress in the hardening becomes equal to 90, the start of the heating before the resin impregnation makes the level $\alpha$ of progress in the hardening begin to rise at time t1 when $\alpha=90$. As a result, the line c does not pass through the region $R_1$. On the other hand, at time t2, the line passes through a point where the level $\alpha$ of progress in the hardening=170, that is to say, at time t2, the level $\alpha$ of progress in the hardening≥140, and the line c accordingly passes through the region $R_2$, as shown in the graph.

In the case where the staging is performed until the level $\alpha$ of progress in the hardening becomes equal to 45, the start of the heating before the resin impregnation makes the level $\alpha$ of progress in the hardening begin to rise at time t1 when $\alpha=45$. As a result, like the line c, the line d does not pass through the region $R_1$ as shown in the graph. Furthermore, at time t2, the line d passes through a point where the level $\alpha$ of progress in the hardening=130, that is to say, at time t2, the level α of progress in the hardening<140, and the line d accordingly does not pass through the region $R_2$ as shown in the graph.

In sum, FIG. 5 shows that when the staging is performed until the level α of progress in the hardening becomes equal to 45, and when the resin impregnation is completed before the level α of progress in the hardening becomes equal to 140, it is possible to prevent the preform member from not being impregnated with the resin, and to prevent the decrease in the bonding strength of the adhesive 3. Consequently, the strength of the workpiece 11 can be secured. To put it, since the lines a to d each represent a function of time and temperature, the parameters need to be controlled so as for the level α of progress in the hardening to trace the path of the line d.

As described above, according to the preform member bonding method of embodiment 1 of the present invention in the RTM process, the heating before or during the resin impregnation in the VaRTM process makes it possible to prevent the preform member 1 from not being impregnated with the resin as the result of the penetration of the adhesive 3 into the preform member 1 in the workpiece 11, further to prevent the decrease in the bonding strength of the adhesive 3, and resultantly to secure the strength of the workpiece 11. In addition, the condition for the staging can be efficiently determined based on the data from the experiment, instead of based on the operator's sense.

It should be noted that although the foregoing descriptions have been provided using the case where the adhesive 3 is used to bond the preform member 1 and the hardened member 2 together, the present invention is not limited to this case. The present invention is applicable to any case where the adhesive 3 is used to bond the preform member 1 and another member (another preform member) together. Furthermore, although the foregoing descriptions have been provided using the case where the preform member 1 is shaped like the letter T, it is a matter of course that the shape of the preform member 1 is not limited to that of the embodiment.

INDUSTRIAL APPLICABILITY

The present invention is preferable as a preform member bonding method in the RTM process.

REFERENCE SIGNS LIST

1 PREFORM MEMBER
2 HARDENED MEMBER
3 ADHESIVE
3*a* ADHESIVE (SUCKED INTO PREFORM MEMBER 1)
10 MOLD
11 WORKPIECE
12 HEATER
13 VACUUM BAG FILM
14 SUCTION PIPE
15 RESIN RESERVOIR
16 RESIN SUPPLY PIPE
17 RESIN DISTRIBUTION SHEET
21 FIBER STRAND
21*a* FIBER STRAND (WHOSE SURFACE IS COVERED WITH ADHESIVE 3*a*)
21*b* FIBER STRAND (INTO WHICH NO ADHESIVE 3*a* PENETRATES)

The invention claimed is:

1. A preform member bonding method of bonding a preform member to another member with an adhesive in an RTM process, comprising:
   a first step of obtaining data on a range of a level of progress in hardening of the adhesive which allows the adhesive to penetrate the preform member, and data on a range of the level of progress in the hardening of the adhesive which decreases bonding strength of the adhesive;
   a second step of controlling the level of progress in the hardening of the adhesive by heat-treating the adhesive based on the data obtained in the first step, before the preform member comes into contact with the adhesive;
   a third step of bringing the preform member into contact with the adhesive heat-treated in the second step, and heating the preform member and the heat-treated adhesive; and
   a fourth step of injecting resin into the preform member heated in the third step to impregnate the preform member with the resin.

2. The preform member bonding method according to claim 1, wherein the level of progress in the hardening of the adhesive is examined by carrying out an evaluation test on how much the adhesive is sucked into the preform member at a time when the preform member comes into contact with the adhesive, and a peeling test on the adhesive at a time when the resin and the adhesive are completely hardened in the RTM process.

3. A workpiece manufacturing method of manufacturing a workpiece by bonding a preform member and another member with an adhesive in an RTM process, comprising:
   a first step of obtaining data on a range of a level of progress in hardening of the adhesive which allows the adhesive to penetrate the preform member, and data on a range of the level of progress in the hardening of the adhesive which decreases bonding strength of the adhesive;
   a second step of controlling the level of progress in the hardening of the adhesive by heat-treating the adhesive based on the data obtained in the first step, before the preform member comes into contact with the adhesive already in contact with the other member;
   a third step of bringing the preform member into contact with the adhesive heat-treated in the second step, and heating the preform member, the heat-treated adhesive, and the other member;
   a fourth step of injecting resin into the preform member heated in the third step to impregnate the preform member with the resin;
   a fifth step of discharging an excessive portion of the resin, which has been injected in the fourth step, from the preform member and the other member before or after completion of the fourth step; and
   a sixth step of curing the preform member and the other member after completion of the fifth step to manufacture the workpiece.

* * * * *